United States Patent Office 2,729,940
Patented Jan. 10, 1956

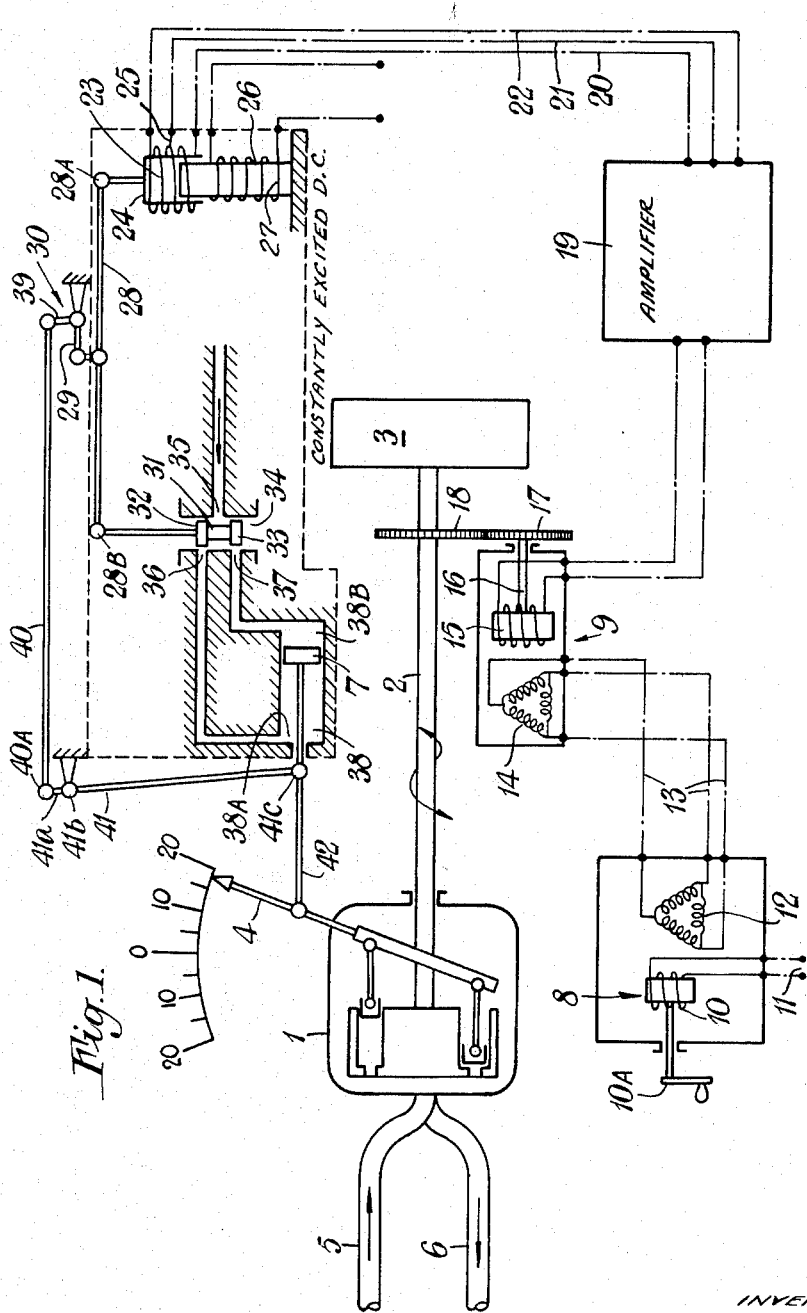

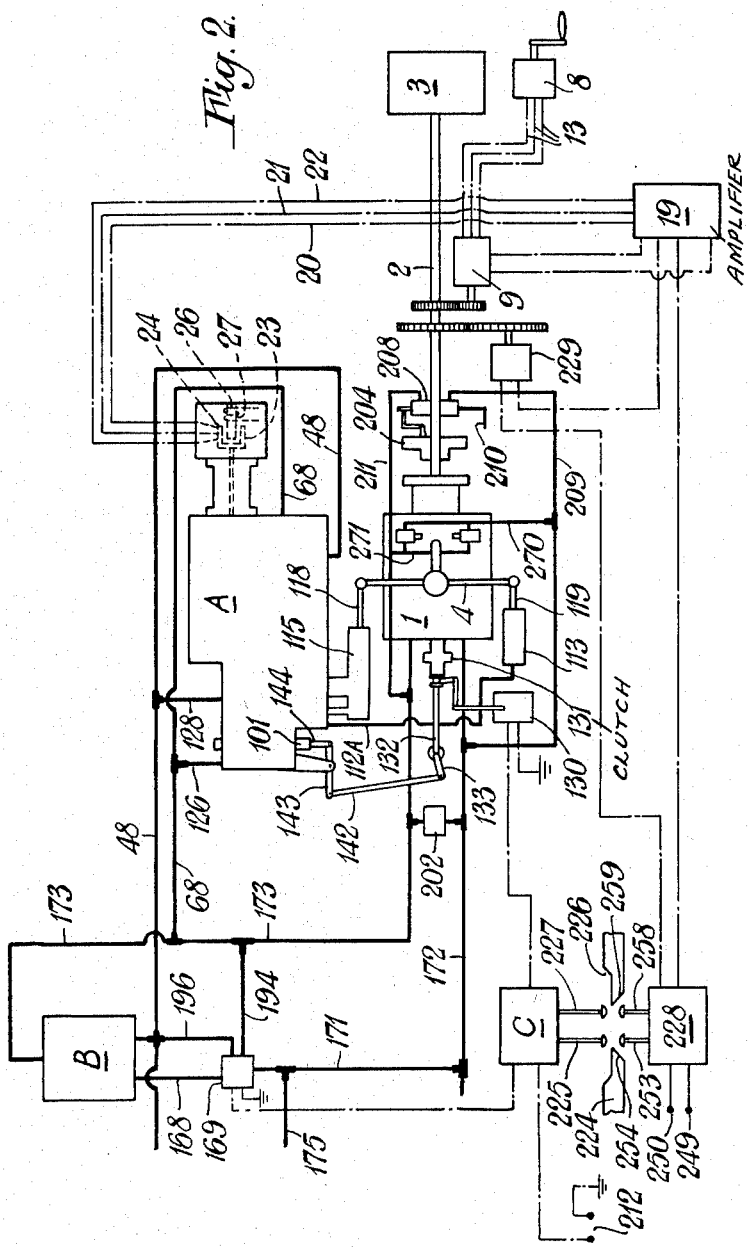

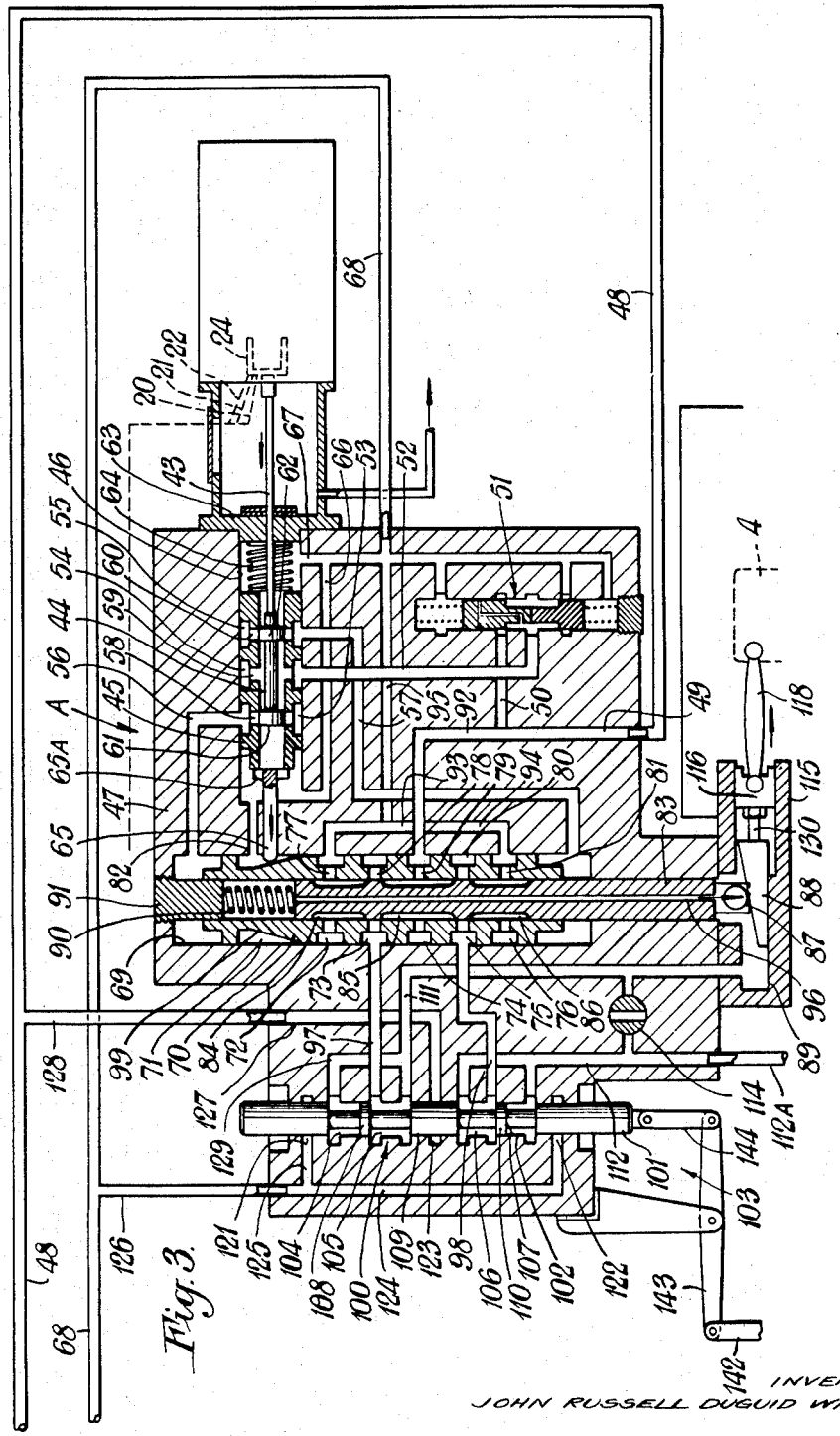

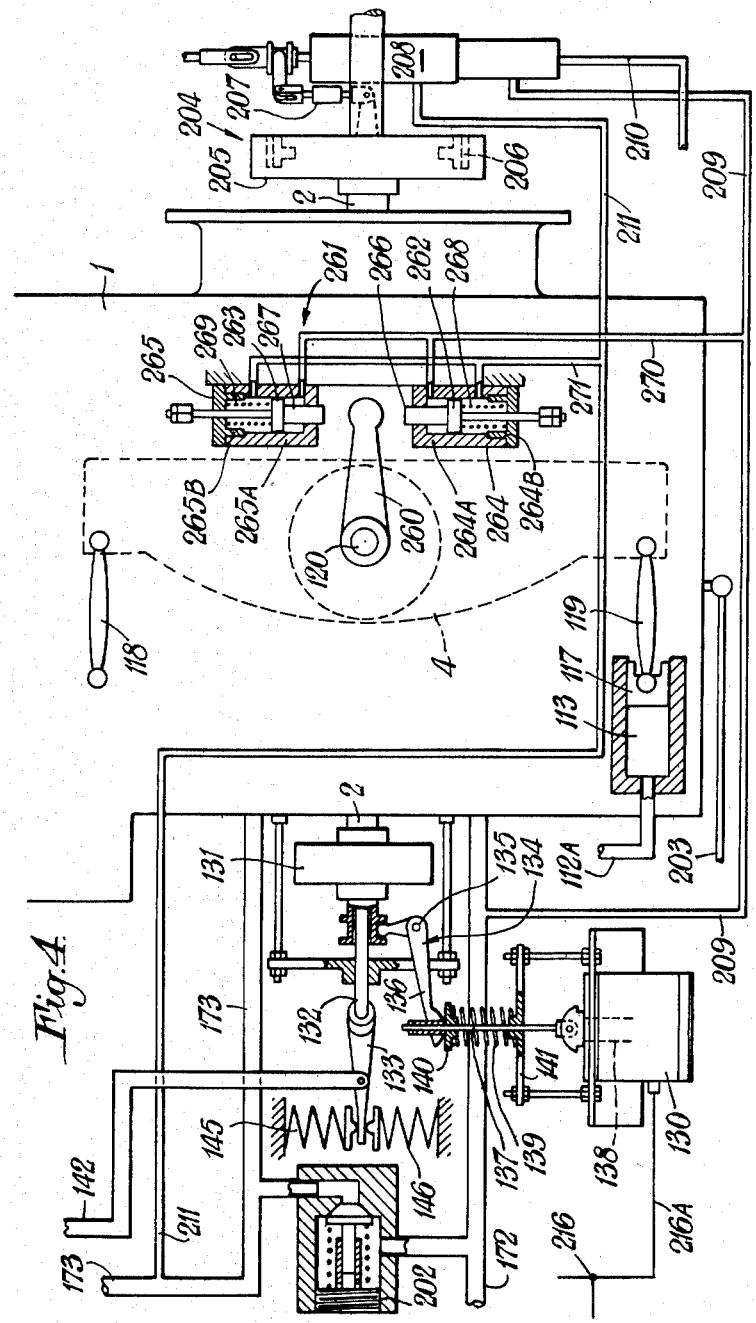

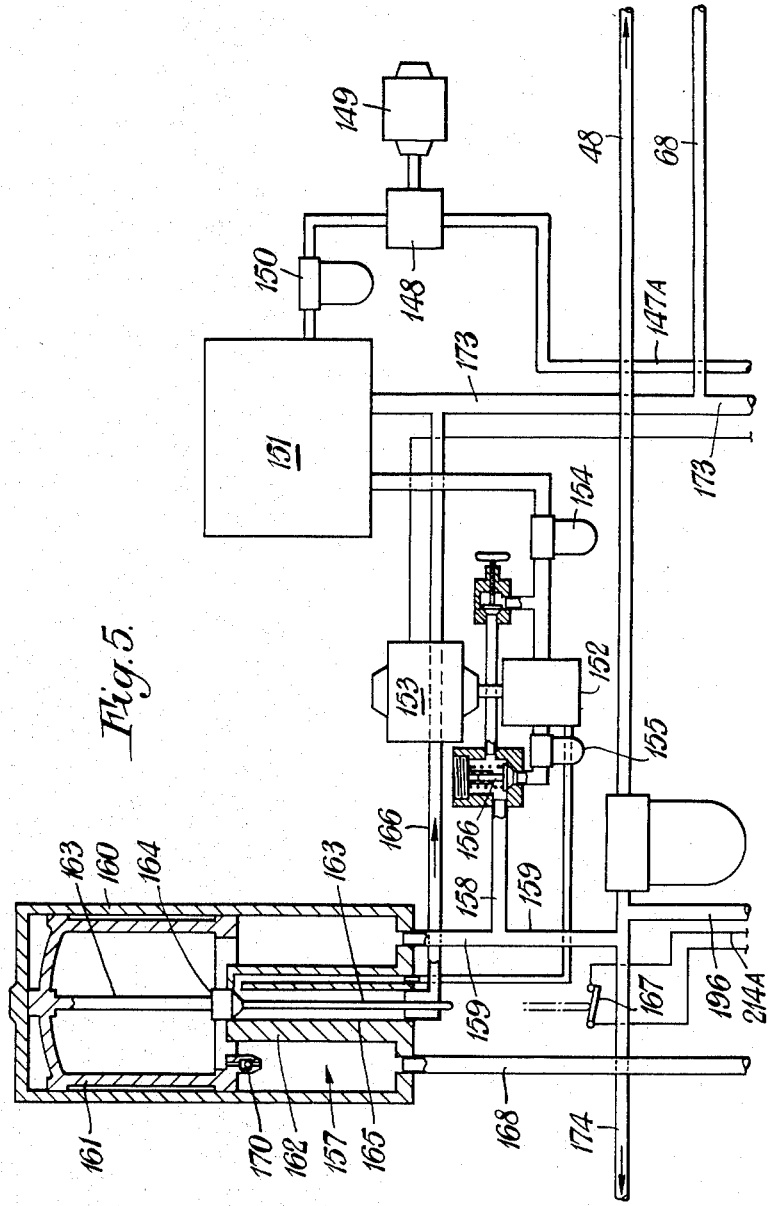

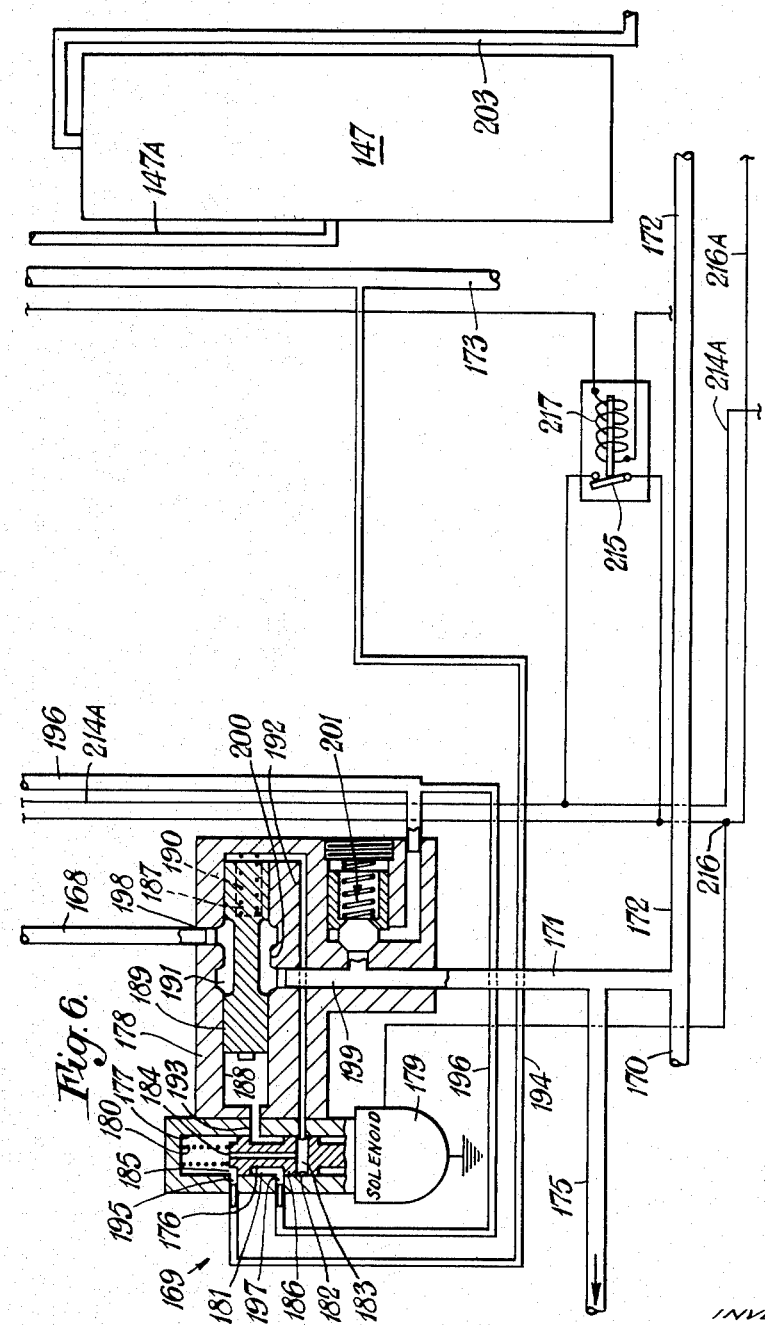

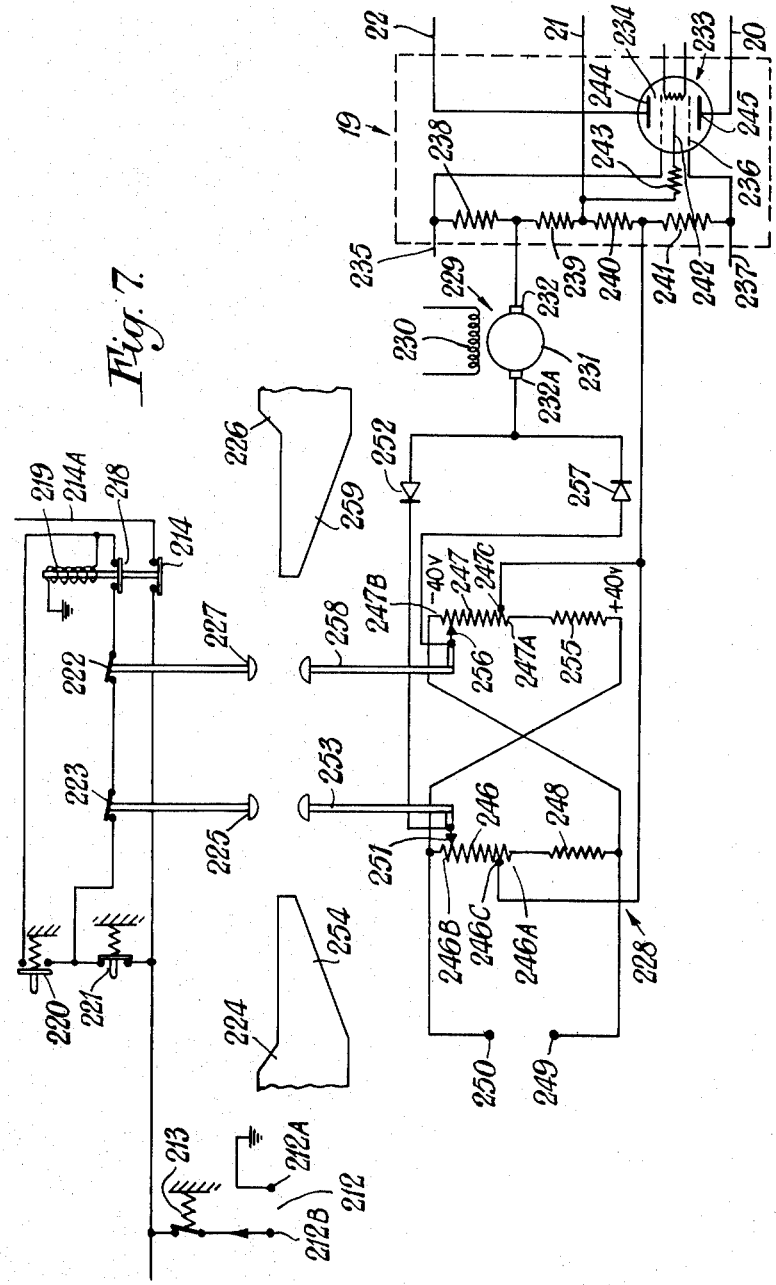

2,729,940

FOLLOW-UP CONTROL SYSTEMS

John Russell Duguid Walker, Westminster, London, England

Application February 10, 1953, Serial No. 336,067

Claims priority, application Great Britain February 11, 1952

14 Claims. (Cl. 60—51)

This invention relates to follow-up control systems and is concerned with a system of the kind in which a transmitter is moved with low power for the control of the receiver which moves correspondingly with relatively high power so that a load driven from the receiver may be moved in coincidence with the transmitter. The load may take various forms according to the use to which the follow-up system is applied. Thus for example the system can be used in the control of gun mountings or generally in the control of machinery.

It is an object of the invention to devise a follow-up system of the kind generally indicated, which will be efficient, compact and self-contained.

In accordance with the invention there is provided a follow-up control system comprising an electric transmitter connected to an electric receiver which receiver is formed as a resetter and is in driving connection with the load shaft, the load shaft being also in driven connection with a hydraulic swash-plate motor, there being electrical connections as between the electric transmitter and receiver to an amplifier arranged to amplify a signal which is a function of the positional displacement as between the transmitter and receiver, such amplified signal being applied through servo mechanism to the adjustment of the angulation of the hydraulic swash-plate motor, whereby such angulation is regulated by the positional difference between the transmitter and receiver so that the torque output of said hydraulic motor applied to the load is made dependent upon such positional displacement.

For a better understanding of the invention and to show how the same may be carried into effect, reference will now be made to the accompanying drawings, in which, Figure 1 is a diagram of a simplified follow-up control system, Figure 2 is a diagram of a part of a more detailed follow-up control system, Figure 3 is a diagrammatic sectional elevation to an enlarged scale of the servo unit of the system of Figure 2, Figure 4 is a diagram showing the motor of the system of Figure 2, Figure 5 is a diagram showing the hydraulic fluid supply for the system of Figure 2, Figure 6 is a diagram showing the blocking valve of the system of Figure 2, and Figure 7 is a diagram showing the amplifier, the governor, the cut-off gear and part of the solenoid energisation circuit of the system of Figure 2.

Referring to Figure 1, a hydraulic swash-plate motor 1 of the V. S. G. type (often called a "B" end), has its power output shaft 2 connected to the inertia load 3. As is well known, the angulation of the swash-plate of a swash-plate motor will determine the torque output therefrom when the motor is supplied with constant pressure operating media. In this example the motor 1 is supplied via a pipe 5 with constant pressure oil which may be at a pressure of 1,100 lbs. per sq. inch. The motor 1 has an exhaust pipe 6 in which the pressure is near atmospheric. The extent of angulation of the swash-plate on either side of a zero setting is determined by a tilt lever 4 controlled by a servo ram 7, the lever 4 being connected to the ram 7 by a rod 42.

The transmitter 8 consists of a so-called magslip or Selsyn device. The electrical receiver 9 consists of a resetter Selsyn device or magslip. The magslip transmitter and resetter are in principle similar to Selsyn transmitter and receiver units. The magslip transmitter 8 consists of a single phase rotor winding 10 connected to a supply source 11 of alternating current. This current may be of low voltage, for example, 20, whilst however being of a frequency of the order of 1,100 cycles per sec. The rotor is turned manually by a directing means 10A. The stator 12 is wound in delta and is connected by three lines 13 to a similarly wound stator 14 in the resetter magslip 9. The resetter magslip rotor 15 is substantially the same as that of the transmitter, but is mechanically connected by a shaft 16 and gear wheels 17 and 18 to the load shaft 2. The winding of the rotor 15 is connected to an amplifier 19. The amplifier 19 is of generally known kind and serves to rectify and amplify the signals which it receives. The rectifier has the output derived from push-pull connections so that there are three output leads 20, 21, 22 from the amplifier, the lead 21 preferably being grounded. The output leads 20 and 22 are connected one to each end of a coil 23 disposed upon an annular coil mount 24, the coil 23 having a centre tapping 25 connected to the lead 21. The coil mount 24 embraces the end of a core 26 upon which there is a constantly excited D. C. winding 27. Thus the core 26 and winding 27 together constitute an electromagnet on which the coil 23 and mount 24 move in accordance with the excitation current that the coil 23 receives from the amplifier 19.

The coil mount 24 is carried pivotally at one end 28A of a link 28 which is itself pivotally supported between its ends by one arm 29 of a bell-crank lever 30. The end 28B of the link 28 is pivotally connected to a spool valve 31. The two end flanges 32, 33 of the spool valve 31 fit in a cylindrical bore 34 having three ports 35, 36, 37. The servo ram 7 is disposed in a cylinder 38, and the ports 36, 37 are connected to the cylinder 38 so that the port 36 is effectively in communication with the end 38A of the cylinder whilst the port 37 is in communication with the end 38B of the cylinder 38. The port 35 is connected to a source of pressure media which may be oil at, for example, 100 lbs per sq. inch pressure. The spool valve 31 is generally arranged so that in one position it admits pressure fluid to neither of the ports 36, 37. This position represents a central position of the spool valve 31. If the spool valve is moved in one direction away from the central position, then it effectively connects the supply of pressure fluid to one of the ports 36, 37 connected with the ram cylinder 38, whereas movement of the spool valve 31 in the other direction effectively connects the other port of the ram cylinder 38 to the supply of pressure fluid. When connecting the supply of pressure fluid to one side of the ram cylinder 38, the spool valve also connects the other side of the ram cylinder to exhaust.

The bell-crank lever 29 has the other arm 39 thereof connected to a link 40. The latter is pivotally connected at its end 40A to one end 41A of a link 41 which is pivotally supported at a point 41B near to its pivotal connection with the link 40. The other end 41C of the link 41 is pivotally attached to the rod 42.

In order to explain the operation of the system described above, it will be supposed that the hydraulic swash-plate motor 1 is connected with a supply of constant pressure oil, and likewise that the spool valve 31 is similarly connected. It will also be supposed that the transmitter magslip rotor 10 is connected to an appropriate alternating current source. If the load 3 and the directing means (identifiable with the magslip rotor 10) are in precise coincidence and the directing means is not being moved, then obviously the load will desirably be stationary. If now the directing means is moved, the rotor 10 of the transmitter magslip is correspondingly displaced and current is transmitted to the magslip resetter stator 14 with the result that an induced current appears in the magslip resetter rotor 15. The current appearing in the resetter rotor 15 is a function of the degree of positional displacement existing as between the magslip transmitter 8 and resetter 9. This current may therefore be regarded as an "error" signal. This signal is rectified and amplified and thereafter a corresponding direct current is applied to the moving coil 23. The moving coil is displaced a distance corresponding to the positional displacement as between the magslip transmitter 8 and resetter 9. The displacement of the moving coil 23 causes a proportional displacement of the spool valve 31, so that depending upon the extent and direction of movement of the moving coil 23, so that spool valve 31 is set to supply pressure fluid to one side or the other of the servo ram 7. The latter therefore moves and causes an appropriate displacement of the tilt lever 4 of the hydraulic swash-plate motor 1. The latter develops torque proportional to the extent of tilting, and therefore the load 3 is moved in a direction such as to reduce and eventually cancel the positional displacement as between the resetter magslip 9 and the transmitter magslip 8. By virtue of the links 41, 40, a displacement of the ram 7 under the action of hydraulic pressure media allowed to enter the ram cylinder 38 by the spool valve 31, will cause an immediate tendency for the spool valve 31 to be displaced in such manner as to tend to prevent further movement of the servo ram 7.

The system shown in Figure 2 is a diagram of a part of a control system for the training gear of a gun mounting of a ship. The training gear employs four swash plate motors for turning the mounting with respect to the ship. Each motor has its own swash plate control gear and two of the motors are connected for supply from one source of high pressure hydraulic fluid and the other two motors are connected to another such source. The diagram shows one motor 1 and its control gear and one pressure source B of hydraulic fluid. The system of Figure 2 employs a transmitter 8, resetter 9, the rotor of which is geared to the output shaft 2 of a motor 1 driving a load 3, an amplifier 19, a coil 23, a mount 24, a core 26 and a winding 27, all as previously described in connection with Figure 1.

*Servo unit for controlling angulation of swash plate motor*

The mount 24 (Figure 3) is connected by a rod 43 to a spool valve 44 in a servo unit A. The valve 44 is located in a ported sleeve 45 which is slidable longitudinally in a bore 46 formed in a valve body 47. High pressure hydralic fluid is delivered to a passageway 49 in the valve body 47 by a pipe 48. A passageway 50 communicating with the passageway 49 delivers high pressure fluid to a reducing valve 51, the reduced pressure fluid being conveyed from the valve 51 by a passageway 52 to the bore 46. The sleeve 45 has three annular grooves 53, 54 and 55 around the periphery thereof. The groove 53 communicates with a passageway 56, the groove 54 with the passageway 52 and the groove 55 with a passageway 57. The grooves 53, 54 and 55 communicate with the interior of the sleeve 45 via ports 58, 59 and 60 respectively. In the central position of the spool valve 44, the two flanged ends 61 and 62 thereof cover the ports 58 and 60 respectively.

When the spool valve 44 is displaced to the left (Figure 3) the passageway 52 communicates with the passageway 56 by way of the groove 54, port 59, the interior of the sleeve 45, the ports 58 and groove 53. When the spool valve 44 is displaced to the right (Figure 3) the passageway 52 communicates with the passageway 57 via the groove 54, ports 59, interior of the sleeve 45, ports 60 and groove 55.

The bore 46 is closed at the right-hand end thereof (Figure 3) by a cover plate 63. One end of a spring 64 abuts against the cover plate 63 and the other end of the spring abuts against the sleeve 45. The spring 64 urges the sleeve 45 against two laterally projecting lugs 65A of a plunger 65. The ends of the bore 46 communicate via passageways 66 and 67 with an exhaust pipe 68.

The passageways 56 and 57 communicate with the upper and lower ends respectively of a cylindrical bore 69. A sleeve-like piston 70 is located in the bore 69, and this piston has annular grooves 71, 72, 73, 74, 75 and 76 around the periphery thereof. The grooves 72 to 76 communicate with the interior of the sleeve-like piston by way of ports 77 to 81 respectively. The groove 71 communicates with the left-hand end of the bore 46 by way of a passageway 82 to vent fluid displaced by the plunger 65.

A plunger 83 having annular grooves 84, 85 and 86 around the periphery thereof is slidably located within the piston 70. The lower end of the plunger 83 carries a roller 87 which rests on a wedge 88 located in a chamber 89. A spring 90 for urging the plunger downwardly is located between the upper end of the plunger 83 and a plug 91 screwed into the body 47. The plunger 83 has an axial hole 96 therethrough so that the pressure existing in the chamber 89 does not cause the plunger to press the roller 87 off the wedge 88. That is to say, the pressure existing in the chamber 89 is communicated to the upper end of the plunger whereby the pressure forces on the upper and lower ends of the plunger are equalised.

A passageway 92 branched off the passageway 49 delivers high pressure fluid to the bore 69 adjacent the groove 74 of the piston 70. The grooves 72 and 76 communicate via passageways 93, 94 and 95 with the exhaust pipe 68. The groove 73 communicates with a passageway 97 and the groove 75 with a passageway 98. The bottom of the groove 71 is formed by a frusto-conical surface 99 on which the plunger 65 bears.

In their central positions the piston 70 and plunger 83 are in the positions shown in Figure 3. When as a result of movement of the moving coil 24 intermediate pressure fluid is delivered either to the upper or lower end of the bore 69, the piston 70 moves either downwardly or upwardly in the bore 69. Suppose, for example, the intermediate pressure fluid is delivered to the upper end of the bore 69, and the sleeve-like piston 70 thereby caused to move downwardly, high pressure fluid will flow from the passageway 92 via groove 74, ports 79, groove 85, ports 78 and groove 73 to the passageway 97. If the piston 70 is displaced upwardly, high pressure fluid will flow from the passageway 92 to the passageway 98. When the piston 70 moves downwardly fluid below the piston 70 leaks from the bore 69 via passageway 57, groove 55, ports 60, interior of the sleeve 45, bore 46, and passageway 67 to the exhaust pipe 68. Similarly, when the piston 70 to moves upwardly fluid above the piston 70 leaks to exhaust via passageways 56 and 66.

When the piston 70 moves downwardly, the plunger 65 and sleeve 45 under the action of the spring 64 move to the left (Figure 3) whereby the ports 58 are again aligned with the flange 61 and further flow of intermediate pressure fluid to the upper end of the piston 70 is prevented. Leak-off from the lower end of the piston 70 is also prevented.

When the piston 70 is moved upwardly, the plunger 65 and sleeve 45 are moved to the right (Figure 3) whereby the ports 60 are aligned with the flange 62 and further flow of intermediate pressure fluid to the lower end of the piston 70 is prevented. Also leak-off from the upper end of the piston 70 is prevented. The sleeve 45, it will be seen, acts as a cut-off member which, when operated, prevents further flow of fluid to the bore 69.

The ports 97 and 98 lead to a braking valve 100. This valve has a member 101 which is vertically slidable in a bore 102 in the body 47, under the control of a linkage 103 attached to the lower end of the member 101. The member 101 has annular grooves 104, 105, 106 and 107 around the periphery thereof. The member 101 has a land 108 between the grooves 104 and 105, a land 109 between the grooves 105 and 106 and a land 110 between the grooves 106 and 107. In the central position of the member 101, the passageway 97 communicates with the groove 105 which also communicates with a passageway 111 leading to the chamber 89, and the passageway 98 communicates with the groove 106 which in turn communicates with a passageway 112 and pipe 112A (Figures 2, 3 and 4) which leads to a cylinder 113 (Figures 2 and 4). A by-pass valve 114 (normally closed) is connected between the passageways 111 and 112. The righthand end (Figure 3) of the chamber 89 is formed as a cylinder 115 in which a piston (or ram) 116 is located. A piston (or ram) 117 (Figure 4) is located in the cylinder 113. The pistons 116 and 117 are pivotally connected to opposite ends of the tilt lever 4 of the swash plate motor 1 by means of links 118 and 119 (Figures 2 and 4).

When high-pressure fluid is delivered to the chamber 89, the piston 116 is forced to the right (Figure 3) and the tilt lever 4, which is pivoted at 120 (Figure 4), turns in a clockwise direction, the cylinder 113 (Figure 4) communicating with exhaust by way of the pipe 112A, the passageway 112, groove 106, passageway 98, groove 75, ports 80, groove 86, port 81, groove 76 and passageways 94 and 95. When high pressure fluid is delivered to the cylinder 113 the lever 4 is turned in an anticlockwise direction and fluid in the chamber 89 flows in the exhaust pipe 63 via passageway 111, groove 105, passageway 97, groove 73, port 78 and groove 84, port 77, groove 72, and passageways 93 and 95.

As the piston 70 moves downwardly or upwardly, the piston 116 is caused to move to the right or left, respectively (Figure 3). The wedge 88 is attached to the piston 116 by a rod 130 and therefore also moves with the piston 116. When the piston 116 moves, therefore, the plunger 83 which is urged downwardly by the spring 90 also moves by an amount depending upon the slope of the upper surface of the wedge 88. The slope of this wedge is arranged so that for a given movement of the piston 70 and hence of the piston 116, the plunger 83 will descend or rise sufficiently to cause the ports 78 and 80 to be blanked-off by the lands on the plunger 83, which hence acts as a cut-off member and stops the supply of high pressure fluid to the cylinders 113 or 115. The piston 70 and plunger 83, hence, take up the same relative positions as that indicated in Figure 3.

Function of braking valve

Annular grooves 121, 122 and 123 are formed around the bore 102, the grooves 121 and 122 communicating with the exhaust pipe 68 via passageways 124, 125 and a pipe 126. The groove 123 communicates with the high pressure supply pipe 48 by way of a passageway 127 and a pipe 128.

Suppose, for example, high pressure fluid is being delivered to the chamber 89. The lever 4 is displaced in a clockwise direction from its zero setting, whereby the motor 1 drives the shaft 2 to cause the gun mounting to train right. If it is desired to brake the gun mounting whilst it is training right, the member 101 is moved upwardly by the linkage 103. This causes the high pressure fluid-carrying passageway 127 to communicate with the groove 106 which is then in communication only with the passageway 112 since the land 110 will have blanked-off the passageway 98. The passageway 111 will be blanked-off by the land 109, but a branch passageway 129 enables the passageway 111 to communicate with the groove 104 which is then in communication with the groove 121 and hence with the exhaust pipe 68. The chamber 89 is therefor exhausted and high pressure fluid is fed to the chamber 113. The tilt lever 4 is therefore forced in an anti-clockwise direction and the shaft 2 is hydraulically braked.

Braking valve operating gear

The braking valve 100 is operated by a solenoid 130 (Figures 2 and 4) and the direction of movement of the member 101 in the bore 102 is determined by the direction of rotation of the shaft 2. The shaft 2 is connectible through a clutch 131 to a shaft 132 having a lever 133 thereon. The part of Figures 2 and 4 showing the lever 133 is in part perspective, the lever 133 being perpendicular to the shaft 132. The clutch 131 is operated by a bell crank 134 (Figure 4) pivoted at 135. The arm 136 of the bell crank 134 is connected to a rod 137 the lower end of which carries an armature 138, which when the solenoid 130 is energised, is drawn into the solenoid. A spring 139 is disposed between an abutment member 140 secured to the rod 137 and an abutment member 141 supported from the solenoid 130. The spring 139 urges the rod 137 upwardly so that when the solenoid 130 is deenergised, the bell crank 134 is displaced in a clockwise direction from the position shown in Figures 2 and 4 and the clutch 131 is engaged to cause the shaft 132 to turn with the shaft 2. The linkage 103 consists of a link 142 (Figures 2, 3 and 4) the lower end of which is pivotally secured to the lever 133 and the upper end of which is pivotally secured to one end of a centrally pivoted lever 143 (Figures 2 and 3), the other end of this lever being pivotally secured by a link 144 to the lower end of the member 101 of the valve 100. When the clutch 131 is disengaged, the lever 133 is spring urged to a central position by centering springs 145 and 146 which act on the free end of the lever 133.

When the motor 1 is driving the shaft 2 in the direction which causes the mounting to train right, engagement of the clutch 131 turns the lever 133 to move the link 142 downwardly (Figures 2, 3 and 4). The link 144 is therefore moved upwardly and the member 101 likewise moves upwardly. As described above, when the member 101 moves upwardly, high pressure fluid is fed to the cylinder 113 and the tilt lever 4 is moved in an anti-clockwise direction whereby the motor 1 brakes the mounting. Similarly, if the mounting is training left, engagement of the clutch 131 causes the link 142 to move upwardly and hence the member 101 moves downwardly, whereby high pressure fluid is caused to be fed to the cylinder 115 and the mounting is again braked by the motor 1.

Hydraulic fluid supply

Hydraulic fluid is lifted from a drain tank 147 (Figure 6) through a pipe 147A by a pump 148 driven by an electric motor 149 and is delivered through a filter 150 to a main header tank 151. A drain pipe 203 (Figures 4 and 6) leads from the bottom of the motor 1 to the tank 147. A main pump 152 driven by an electric motor 153 draws fluid from the tank 151 through a strainer 154 and forces fluid through a filter 155 and a non-return valve 156 into an accumulator 157. The fluid is delivered to the accumulator 157 from the pump 152 by way of a pipe 158 and a pipe 159. The hydraulic accumulator consists of a closed cylindrical container 160 having a hollow piston 161 therein, the piston being open at the lower end thereof. A spigot 162 extends upwardly from the bottom of the container 160 and a rod 163 the upper end of which is secured to the piston passes downwardly through the centre of the spigot 162. The rod 163 has a collar 164 which acts as a piston in the bore 165 through the spigot 162, to prevent leakage of hydraulic fluid from the accumulator down the bore 165. Any fluid which does so leak is conveyed from the bottom of the bore 165 to the tank 151 by way of a pipe 166. The lower end of the rod 163 passes through the bottom of the container 160 and serves to open a switch 167 when the piston 161 in the accumulator is near the bottom of the container 160.

An outlet pipe 168 leads from the bottom of the container 160 to a blocking valve 169 (Figure 6). The lower end of the piston 161 carries a projecting plug 170 which closes the entrance to the pipe 168 when the piston reaches the bottom of the container 160.

Hydraulic fluid under pressure for the engine 1 is supplied from the pipe 168 through the blocking valve 169, a pipe 171 (Figures 2 and 6) and a pipe 172 (Figures 2, 4 and 6). Exhaust fluid from the engine is returned to the header tank 151 by way of pipe 173 (Figures 2, 4, 5 and 6). The pipe 68 previously referred to branches into the pipe 173 (Figure 5). The pipe 48, which serves to deliver high pressure fluid to the servo unit is connected to the pipe 159. A pipe 174 is also connected to the pipe 159, for delivering high pressure hydraulic fluid to the servo unit of the other swash plate engine of the pair fed from the accumulator 157. A pipe 175 (Figure 6) leads from the pipe 171 to the other swash plate motor of the pair.

*Blocking valve*

The blocking valve 169 has a plunger 176 slidably entered in a bore 177 in a valve body 178. The plunger 176 is controlled by a solenoid 179 acting oppositely to a spring 180. In the position shown in Figure 6, the plunger 176 is in its uppermost position corresponding to that in which the solenoid is energised. When the solenoid is de-energised, the spring 180 pushes the plunger downwardly from the position shown in Figure 6. The plunger 176 has annular grooves 181 and 182 around the periphery thereof. A diametral port 183 communicates with a groove 182 and with the lower end of an axial passageway 184 extending from the top of the plunger 176. The upper side of the groove 181 is bounded by a land 185 and the lower side by a land 186.

A spool valve 187 is disposed in a bore 188 in the body 178. The valve 187 is slidable horizontally in the bore 188. The valve 187 has lands 189 and 190 at its ends, with a groove 191 between these two lands. The right-hand end (Figure 6) of the bore 188 communicates with one end of a pipe 192 the other end of which communicates with the bore 177 at a point in register with the groove 182 when the plunger 176 is in its upper position. The left-hand end of the bore 188 communicates with one end of a passageway 193 the other end of which communicates with the upper part of the groove 181 when the plunger 176 is in its upper position. One end of a pipe 194 is connected to the exhaust pipe 173 and the other end of the pipe 194 communicates with a passageway 195 which leads to the upper end of the bore 177. One end of a pipe 196 is connected to the high pressure fluid-carrying pipe 48 and the other end of the pipe 196 communicates with a passageway 197 which leads to the bore 177. The passageway 197 communicates with the bore 177 at a point adjacent the lower portion of the groove 181 when the plunger 176 is in its upper position.

When the solenoid 179 is energized, high pressure fluid from the pipe 196 is fed to the left-hand end of the valve 187 by way of the groove 181 and passageway 193. The right-hand end of the valve 187 communicates with exhaust by way of the pipe 192, groove 182, port 183, passageway 184, the upper end of the bore 177 and pipe 194. The valve 187 is therefore forced to the right-hand end of the bore 188. When in this position hydraulic fluid flows from the pipe 168 through a passageway 198, the groove 191, a passageway 199 to the pipe 171 and thence to the motor 1. When the solenoid is de-energised, the spring 180 forces the plunger 176 downwardly to a position where the land 185 is below the passageway 193 but above the passageway 197. When in this position the land 186 is below the passageway 192 and hydraulic fluid is fed from the pipe 196 to the right-hand end of the spool valve 187. The left-hand end of the spool valve 187 communicates with exhaust by way of the passageway 193, the upper end of the bore 177 and pipe 194. The spool valve 187 is therefore forced to the left-hand end of the bore 188 and the land 190 enters the part 200 of the bore 188 thereby preventing flow of hydraulic fluid from the pipe 168 to the pipe 171 and motor 1.

*Relief valves*

The passageway 199 is capable of communicating with the pipe 196 through a non-return relief valve 201 (Figure 6), in such a way that fluid can flow from the passageway 199 to the pipe 196 but not in the opposite direction.

The pipe 173 (Figure 4) is connected to the pipe 172 through a non-return relief valve 202 (Figure 4) in such a way that fluid can flow from the pipe 173 to the pipe 172 but not in the opposite direction. When the blocking valve 169 is closed, continued operation of the motor 1 causes a drop in pressure in the supply line 172. Cavitation is, however, prevented from taking place in the pipe 172, since when the pressure in the pipe 172 becomes less than the pressure in the exhaust pipe 173, the valve 202 opens and permits the flow of fluid from the pipe 173 to the pipe 172.

*Parking brakes*

A parking brake 204 (Figures 2 and 4) cooperates with the shaft 2 to prevent the latter being rotated when no high pressure fluid is being delivered to the engine 1. The brake 204 consists of a brake drum 205 (Figure 4) secured on the shaft 2 and brake shoes 206 which are operated by links 207 from a hydraulic ram 208. High pressure fluid is fed to the ram 208 by a pipe 209 connected to the pipe 172. The ram is alternatively operated by hydraulic fluid under pressure fed to the ram by a pipe 210 which leads from the high pressure pipe (not shown) feeding the other pair of motors associated with the other source of high pressure hydraulic fluid. An exhaust pipe 211 leads from the ram 208 to the pipe 173. A pipe 170 (corresponding to the pipe 210) leads from the pipe 171 to the parking brakes associated with the other pair of motors.

When no hydraulic fluid under pressure is fed to the ram 208, the brake shoes 206 bear on the inner surface of the drum 205 to prevent rotation of the shaft 2 and hence rotation of the mounting. When hydraulic fluid under pressure is supplied to the ram 208 by either the pipe 209, or 210, or by both, the ram operates to release the shoes 206 from the drum 205.

*Solenoid energisation circuit*

The solenoids 130 and 179 are energised through an energisation circuit C (Figure 2) from an electric power supply 212. The terminal 212A (Figure 7) of the supply 212 is earthed and the terminal 212B is connected through an emergency stop switch 213 (which is spring urged to its closed position), a solenoid controlled switch 214 (which is spring urged to its open position), a wire 214A (Figures 7, 6 and 5) and either the switch 167 (Figure 5) or switch 215 (Figure 6), to a junction point 216 (Figure 6). The switch 167 is spring urged to a closed position and the switch 216 is spring urged to its open position. A solenoid 217 in the electric supply circuit of the motor 153 (Figure 5) closes the switch 215 against the opposition of a spring when the motor 153 is energised. The junction point 216 (Figure 6) is connected through the solenoid 179 to earth and also via a wire 216A (Figures 6 and 4) through the solenoid 130 to earth. The switch 214 (Figure 7) is connected in tandem with a switch 218 and these two switches are closed against spring opposition by the energisation of a solenoid 219. One terminal of the solenoid 219 is earthed and the other terminal is connected to the terminal 212B either through a training power "on" switch 220, a training power "off" switch 221 and the switch 213, or through the switch 218, a switch 222, a switch 223, the switch 221 and the switch 213. The switches 220 and 221 are manually operated, the switch 220 being spring urged open and the switch 221 being spring urged closed. The switches 222 and 223 are opened by cam means against the action of springs.

With the switches in the positions shown in Figure 7, the solenoid 219 is energised through the switches 213, 221, 223, 222 and 218. The solenoids 179 and 130 are energised through the switches 213 and 214 and either the switch 167 or 215 or both. Should the switch 215 be opened by the electric supply circuit through the motor 153 (Figure 5) being interrupted, the solenoids 130 (Figure 4) and 179 (Figure 6) will remain energised until the piston 161 (Figure 5) in the accumulator 157 has descended to the bottom of the container 160. Then the rod 163 will cause the swtich 167 to be opened. Alternatively, if the accumulator 157 is empty (i. e. switch 167 open), the solenoids 130 and 179 will only be energised when the electric supply circuit to the motor 153 is completed.

With the switches 167 and 215 closed, should either of the switches 213 or 221 be even momentarily opened the solenoid 219 is de-energised and the switches 218 and 214 open, hence the solenoids 130 and 179 are de-energised. When the switches 213 and 221 are again both closed the solenoid 219 can be re-energised by momentarily closing the switch 220, the switches 214 and 218 then close, whereby the solenoids 130 and 179 are re-energised and the solenoid 219 is energised through the switches 221, 223, 222 and 218. It will be recalled that when the solenoid 179 is de-energised, the blocking valve 169 prevents the supply of high pressure hydraulic fluid to the motor 1, and when the solenoid 130 is de-energised, the valve 100 operates to cause turning of the tilt lever 4 to cause the motor 1 to brake the rotary movement of the mounting.

*Limitation of training*

Rotary movement of the mounting in the left training direction and in the right training direction is limited. When the mounting reaches the extreme left training limit, a cam 224 (Figure 7) encounters a push rod 225 which latter is urged upwardly from the position shown in Figure 7 to open the switch 223. Opening of this switch causes the solenoid 219 to be de-energised whereby the switches 214 and 218 are opened and the solenoids 179 and 130 are de-energised.

When the mounting reaches the extreme right training limit, a cam 226 encounters a push rod 227 which latter is urged upwardly from the position shown in Figure 7 to open the switch 222 whereby the solenoid 219 is de-energised. When the solenoid 219 is de-energised, the switches 214 and 218 are opened and the solenoids 130 and 179 are de-energised. The solenoid 219 is re-energised to close the switches 214 and 218 by manually closing the switch 220. The switch 220 is maintained closed until the mounting has been caused to turn sufficiently for the switch 222, or 223, as the case may be, to become closed.

*Speed governor*

Angular velocity of the mounting is checked before the cams 224 or 226 encounter the push rods 225 or 227 by an electric circuit 228 (Figures 2 and 7) connected to the amplifier 19.

The circuit 228 is fed by the output of a tacho-generator 229 (Figures 2 and 7) having a constantly excited field winding 230 (Figure 7) and an armature 231 geared to the shaft 2. The voltage developed across the brushes 232, 232A of the generator 229 is proportional to the speed of the shaft 2 and hence to the angular velocity of the mounting.

The amplifier 19 has a double triode valve 233, one grid 234 of which is connected to one wire 235 (Figure 7) from the previous stage of the amplifier 19, and the other grid 236 of the valve 233 is connected to the other wire 237 from the previous stage of the amplifier 19. Four resistances 238, 239, 240 and 241 are conected between the wires 235 and 237. A common cathode 242 for the two halves of the valve 233 is connected through a resistance 243 to the lead 21 and to the junction between the resistances 239 and 240. One anode 244 of the valve 233 is connected to the lead 22 and the other anode 245 is connected to the lead 20. The brush 232 is connected to the junction between the resistances 238 and 239. The junction between the resistances 240 and 241 is connected to a point 246C on a potentiometer 246 and is also connected to a point 247C on a potentiometer 247.

The point 246C is near the end 246A of the potentiometer 246, which end is connected through a resistance 248 to a D. C. supply terminal 249 at a potential of, for example, −40 volts. The end 246B of the potentiometer 246 is connected to a positive D. C. supply terminal 250 at a potential of, for example, +40 volts. A slider 251 associated with the potentiometer 246 is connected through a metal rectifier 252 to the brush 232A of the generator 229. The rectifier 252 is arranged to prevent current from flowing from the slider 251 to the brush 232A. Movement of the slider 251 is controlled by a push rod 253 the upper end of which is positioned for co-operation with a cam 254. The push rod 253 is spring urged upwardly to the position shown in Figures 2 and 7. The push rod 253 and cam 254 are arranged so that as the mounting trains left, the cam 254 will encounter the push rod 253 just before the cam 224 encounters the push rod 225.

The point 247C is near the end 247A of the potentiometer 247, which end is connected through a resistance 255 to the terminal 250. The end 247B of the potentiometer 247 is connected to the terminal 249. A slider 256 associated with the potentiometer 247 is connected through a metal rectifier 257 to the brush 232A of the generator 229. The rectifier 257 is arranged to prevent flow of current from the brush 232A to the slider 256. Movement of the slider 256 is controlled by a push rod 258 the upper end of which is positioned for co-operation with a cam 259. The push rod 258 is spring urged upwardly to the position shown in Figures 2 and 7. The push rod 258 and cam 259 are arranged so that as the mounting trains right, the cam 259 encounters the push rod 258, just before the cam 226 encounters the push rod 227.

The points 246C and 247C are located at positions where the potential is zero. For the intended maximum speed of angular rotation of the turret, the voltage across the brushes 232A, 232 is the same as the potential of the terminal 249 or 250. In the example chosen, this voltage across the brushes 232, 232A is 40. If the voltage across the brushes exceeds this value because the mounting is overspeeding, the potential of one of the sliders (when in the positions shown in Figure 7) is exceeded and hence current flows through one of the rectifiers 252 or 257. The direction of rotation of the armature 231 determines whether it is the potential of the slider 251 or the slider 256 that is exceeded and hence whether it is the rectifier 252 or 257 that conducts. When current flows through one of the rectifiers 252, 257, it does so either through a circuit comprising the generator 229, rectifier 252, slider 251, potentiometer 246, point 246C, resistance 240 and resistance 239, or through a circuit comprising generator 229, resistance 239, resistance 240, point 247C, potentiometer 247, slider 256 and rectifier 257. When current flows through one of these two generator circuits an excess voltage is applied across the resistances 239 and 240.

The excess voltage applied across the resistances 239 and 240 is impressed upon the grids 234 and 235 which varies the currents already flowing in the wires 20, 21 and 22 on account of the error voltage. The variation of these currents is such that the coil mount 24 moves in the direction that will cause the motor to accelerate less or to slow down. It will also be understood therefore that the circuit 228 serves as a governor for limiting the maximum speed of angular rotation of the mounting.

As the mounting approaches either of the limits of training, the rod 253 will encounter the cam 254, or the rod 258 will encounter the cam 259. One of the push rods will be pushed down, and hence one of the sliders 251, 256, will be slid down its associated potentiometer. The potential of the slider that moves will be reduced and hence a generator voltage of less than 40 will cause a current to flow through the resistances 239 and 240 whereby the speed of the motor is caused to be reduced.

It will be understood, therefore, that the maximum speed of the mounting is reduced progressively in proportion to the amount the push rod 253, or 258, is pushed down by its associated cam.

The points 246C and 247C on the potentiometers 246 and 247 are such that when the associated slider is in register with the point 246C or 247C the speed of the motor 1 will be reduced to zero. The sliders are, however, arranged to go below the points 246C and 247C so as to allow a margin in case of wrong adjustment. It will be realised therefore that the mounting should stop before the cam 224 encounters the rod 225 or before the cam 226 encounters the rod 227. These cams, push rods and their associated switches 222, 223 therefore act as emergency stopping means at the extreme limits of training.

*Tilt lever centering mechanism*

The tilt lever 4 has a lever 260 (Figure 4) secured thereto, the lever 260 co-operating with tilt centering mechanism 261 for maintaining the tilt lever in its zero setting when no hydraulic fluid under pressure is supplied to the motor 1. The mechanism 261 has two servo rams 262 and 263 located in cylinders 264 and 265 respectively. The rams 262 and 263 carry abutment members 266 and 267 respectively. A spring 268 urges the ram 262 and abutment member 266 towards the free end of the lever 260 and a spring 269 urges the ram 263 and abutment member 267 towards the free end of the lever 260. The ends 264A, 265A of the cylinders 264 and 265 are provided with ports which are connected by a pipe 270 to the pipe 209. The ends 264B, 265B of the cylinders 264 and 265 are connected by a pipe 271 to the pipe 211.

When the blocking valve 169 (Figure 6) is open the pipe 209 (Figure 4) is connected to the source of hydraulic fluid under pressure and the rams 262 and 263 are forced away from the free end of the lever 260 against the opposition of the associated springs 268 and 269. Exhaust fluid flows from the ram cylinders via the pipes 271 and 211. When the blocking valve 169 is closed, the pressure falls in the pipe 270 and the springs 268 and 269 reassert themselves whereby the abutment members 266 and 267 force themselves against the free end of the lever 260 in opposition to each other, and maintain the free end of the tilt lever midway between the cylinders 264 and 265. When the lever 260 is in this position the tilt lever 4 is in its central position.

*Summary of operation*

In the system described with reference to Figures 1 to 7, when a misalignment occurs between the rotor 10 and rotor 15, the mount 24 is moved by an amount which is a function of the misalignment between these two rotors. The spool valve 44 moves in correspondence with the mount 24 and causes intermediate pressure fluid to be applied either to the upper or lower end of the sleeve-like piston 70. Movement of the piston 70 causes corresponding movement of the plunger 65 to cause such movement of the sleeve 45 that continued supply of intermediate pressure fluid to the upper or lower end of the piston 70 is prevented. Upward or downward movement of the piston 70 causes high pressure fluid from the passageway 92 to be passed through the valve 100 to either the cylinder 113 or the cylinder 115 whereby the lever 4 is tilted either in a clockwise or anti-clockwise direction. The cylinder 113, 115 that does not have high pressure fluid delivered thereto is connected through the valve 100 and the ports in the piston 70 to the passageway 95 and then to exhaust. Tilting of the lever 4 involves movement of the wedge 88 which in turn causes movement of the plunger 83. The plunger 83 moves to follow the movement of the piston 70 that has just taken place, whereby the continued supply of high pressure fluid to either the cylinder 113 or 115 stops. The torque applied to the shaft 2 by the motor 1 is proportional to the angular displacement of the tilt lever 4 from its central position. Since the inertia of the mounting is constant, the acceleration of the mounting will also be proportional to the angle of displacement of the lever 4 from its central position.

In practice the misalignment between the rotors 10 and 15 continuously varies. Hence the spool valve 44, sleeve 45, piston 70, plunger 83 and tilt lever 4 are continuously moving. The motor 1 is therefore continuously accelerating and decelerating. When the motor 1 is decelerating, the mounting tends to drive the motor and hence high pressure hydraulic fluid is forced from the motor along the high pressure fluid supply pipe 172, and the pipe 171, through the blocking valve 169, and pipe 168 to the accumulator 157. Some of the power applied to the motor during acceleration is therefore regained during deceleration.

If an emergency occurs, one of the switches 213, 221 is manually opened, whereby the solenoids 130 and 179 are de-energised. When the solenoid 130 is de-energised, the clutch 131 (or friction drive) is engaged with the shaft 2 and via the linkage 103 the braking valve 100 is operated. This has the effect of applying high pressure fluid to the cylinder 113 or 115 according to the direction of rotation of the shaft 2, the other of these two cylinders being connected to exhaust. Hence the tilt lever 4 is moved to cause the motor 1 to generate a reverse torque. On operation of the valve 100 the cylinder that was being supplied with high pressure fluid before the solenoid 130 was de-energised, is connected to exhaust. Hence the tilt lever 4 is moved to cause the motor 1 to stop working. The rotation of the mounting is therefore hydraulically braked.

When the solenoid 179 is de-energised the blocking valve 169 closes and stops the supply of hydraulic fluid to the motor 1. When the blocking valve 169 is closed and the motor is decelerating, the fluid forced along the pipe 172 in a backward direction passes along the pipe 171 through the release valve 201 and into the accumulator 157 via the pipes 196 and 159.

When the blocking valve 169 is closed and the pressure in the pipe 172 has dropped, the ram 208 causes the relatively weak parking brake 204 to be applied on the shaft 2 whereby rotation of the mounting is positively prevented.

De-energisation of the solenoids 179 and 130 also takes place when the mounting reaches the limits of training by the switches 222, 223 being opened as a result of either the cam 226 encountering the push rod 227, or the cam 224 encountering the push rod 225. Hydraulic braking is therefore applied in the same way as if switches 221 or 213 had been opened.

If during operation of the system, the accumulator 157 becomes almost empty, the plug 170 blocks the pipe 168 and prevents supply of hydraulic fluid to the motor 1. The residual fluid trapped in the accumulator 157 is, however, still available to drive the servo unit for a minute or so after the power has been disconnected from the motor 1. The servo unit A is thus controllable for braking purposes.

The governor operates through the remote power control amplifier 19 to prevent the speed of the mounting from exceeding its designed maximum speed. A D. C. arrangement has been described, but a corresponding A. C. arrangement could be used with A. C. amplifiers. The electrical governor has a tacho generator 229 geared to the shaft 2. When the shaft exceeds the designed maximum speed the generator 229 produces sufficient voltage to overcome the backing-off voltage set up by the potentiometers 246 or 247 and thereby overrides the error signal applied to the amplifier 19 by the wires 235, 237 and causes the mount 24 to be moved in a direction opposing that caused by the control signal. The tilt lever 4 is therefore moved in a direction to decelerate the mounting. The governed speed is controlled by the setting of the potentiometers 246 and 247 and these potentiometers are adjusted automatically by means of the cams 254, 259 at the limits of training of the mounting. When the cams 254, 259 encounter either the push rod 253 or 258 the associated potentiometer setting is altered and the governed speed is progressively reduced as the mounting approaches the extreme limits of training.

It is to be understood that a system as described with reference to Figures 1 to 7 can be applied for elevating a gun.

In the case of elevation it happens that there is a great detail of potential energy available in the system which could cause dangerous overspeeding and as an additional precaution a centrifugally operated trip switch is added in series with the emergency switch 213. Furthermore, in the elevating system, the braking valve 100 may be dispensed with and instead the blocking valve 169 may be provided with additional means so that on de-energisation of the solenoid corresponding to solenoid 179, the pressure and return connections to the elevating motor are reversed, thus providing a reverse torque.

I claim:

1. A follow-up control system comprising an electric transmitter, an electric receiver formed as a resetter, a load shaft in driving connection with the resetter, a hydraulic swash plate motor in driving connection with the load shaft, a control member on the motor for controlling the angulation of the swash plate, an assembly having a first principal part consisting of a piston and a second principal part consisting of a cylinder, a first connection from one of said principal parts to the control member for effecting the adjustment of the angulation of the motor, an amplifier, first electrical connections as between the resetter, the transmitter and the amplifier for applying to the amplifier a signal which is a function of the positioned displacement as between the transmitter and the receiver, valve means to control the admission of hydraulic fluid to the said cylinder whereby the piston is displaced relative to the cylinder, second electrical connections as between the amplifier and the valve means for applying the amplified signals to the valve means to operate the latter, a second connection between said one part and the valve means so that displacement of the piston with respect to the cylinder under the action of the hydraulic fluid causes the valve means to be operated to tend to prevent further admission of hydraulic fluid to the cylinder, and a braking valve interposed in the hydraulic circuit between the valve means and said assembly, the braking valve serving, when operated, to effect such flow of hydraulic fluid to the cylinder, whereby the angulation of the motor becomes such that the motor is caused to brake the load.

2. A system according to a claim 1 and further comprising a connection for supplying the braking valve with high pressure hydraulic fluid independently of the valve means, the braking valve, when operated, serving to interrupt the flow of hydraulic fluid between the valve means and the cylinder and serving to admit high pressure hydraulic fluid to the cylinder to cause displacement of the piston with respect to the cylinder, which displacement is in the direction that causes the motor to brake the load.

3. A system according to claim 2 and further comprising a braking valve control member displaceable in one direction to cause braking of the load when the load shaft is turning in one direction, and displaceable in a second direction to cause braking of the load when the load shaft is turning in the opposite direction, and connections including a clutch, between the braking valve control member and said shaft to cause, when the clutch is engaged, displacement of said braking valve control member in the appropriate direction to cause the braking to be effected.

4. A system according to claim 3 and further comprising high pressure hydraulic fluid supply lines to the motor, a hydraulic accumulator in the supply lines for, when the motor is decelerating, recovering some of the energy used by the motor during accelerating, means in the accumulator for stopping the supply of hydraulic fluid to the motor before the accumulator is empty, thereby to maintain the remaining fluid in the accumulator available for operation of the piston and cylinder assembly upon operation of the braking valve.

5. A system according to claim 3, and further comprising high pressure hydraulic fluid supply lines for the motor, a hydraulic accumulator in the supply lines, a blocking valve in the supply lines and between the accumulator and the motor for, when closed, preventing flow of high pressure hydraulic fluid to the motor, a non-return relief valve for permitting flow of fluid from the motor to the accumulator when the blocking valve is closed and the motor is decelerating, a first solenoid for causing engagement of the clutch when the first solenoid is de-energised and disengagement of the clutch when the solenoid is energised, a second solenoid for operating the blocking valve to cause the latter to be opened when the second solenoid is energised and closed when the second solenoid is de-energized, electric supply lines for feeding electric current to the solenoids to energise the latter, and emergency switches in said electric supply lines, the opening of any one of which switches de-energising both solenoids.

6. A system according to claim 5 and further comprising a hydraulic pump for filling the accumulator with hydraulic fluid, an electric motor for driving the pump, an electric motor supply switch in the electric supply lines, an accumulator switch in parallel with the motor supply switch, means for opening the accumulator switch automatically when the accumulator is nearly empty, and means for automatically opening the motor switch when the motor driving the pump is not working, the opening of both the switches causing the solenoids to be deenergised.

7. A system according to claim 5, wherein the extent of movement of the load shaft in at least one direction is limited and the system further comprising means movable with the load shaft to operate one of the emergency switches when the shaft reaches said limit.

8. A follow-up control system comprising an electric transmitter, an electric receiver formed as a resetter, a load shaft in driving connection with the resetter, a hydraulic swash plate motor in driving connection with the load shaft, a control element on the motor for controlling the angulation of the swash plate, a servo mechanism connected to the control element to adjust the angulation of the hydraulic swash plate motor in accordance with signals applied to the mechanism, an amplifier, first electrical connections as between the resetter, the transmitter and the amplifier for applying to the amplifier a signal which is a function of the positional displacement as between the transmitter and the receiver, second electrical connections as between the amplifier and the servo mechanism for applying the amplified signals to the servo mechanism to operate the latter, whereby the angulation of the hydraulic swash plate motor is regulated by the positional difference between the transmitter and the receiver so that the torque output of the hydraulic motor applied to the load is made dependent upon such positional displacement, high pressure hydraulic fluid supply lines to the motor, and a hydraulic accumulator in the supply lines for, when the motor is decelerating, recovering some of the energy used by the motor during accelerating.

9. A system according to claim 8, wherein a blocking valve is provided in the supply line to the motor, the blocking valve, when closed, preventing flow of high pressure hydraulic fluid to the motor, and wherein a non-return relief valve is provided for permitting flow of fluid from the motor to the accumulator when the blocking valve is closed and the motor is decelerating.

10. A system according to claim 8 and further comprising hydraulically-operated parking brakes for preventing rotation of the load shaft when the motor is not working, the parking brakes being released hydraulically when high pressure fluid is supplied to the motor.

11. A system according to claim 8 and further comprising a governor for controlling the maximum speed of rotation of the load shaft, said governor including an electric generator driven from said load shaft, and third electrical connections from the generator to the amplifier to cause the voltage produced by the generator, when the generator exceeds a safe speed, to override that signal which is a function of the positional displacement as between the transmitter and receiver, whereby the angulation of the motor is altered to cause the motor to decelerate.

12. A system according to claim 11 wherein the governor further includes at least one potentiometer for providing an adjustable backing-off voltage, and rectifier means for preventing the generator voltage from operating on the amplifier until the generator voltage exceeds the backing-off voltage of the potentiometer.

13. A system according to claim 12 wherein the governor includes two such potentiometers, one for governing the speed of the load shaft for one direction of rotation, and the other for governing the speed of the load shaft for the opposite direction of rotation.

14. A system according to claim 13, wherein the extent of movement of the load shaft is limited in both directions, and wherein means are provided for automatically adjusting the potentiometers to reduce the appropriate backing-off voltage as the shaft approaches one of the limits, whereby the governed speed of the shaft is reduced as the shaft approaches its limit.

References Cited in the file of this patent

UNITED STATES PATENTS 2,536,876     Dannatt _____ Jan. 2, 1951